(12) United States Patent
Lee

(10) Patent No.: US 7,403,533 B2
(45) Date of Patent: Jul. 22, 2008

(54) AAL2 SWITCHING APPARATUS AND METHOD

(75) Inventor: Woo-Joon Lee, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1004 days.

(21) Appl. No.: 10/361,733

(22) Filed: Feb. 10, 2003

(65) Prior Publication Data

US 2003/0152108 A1    Aug. 14, 2003

(30) Foreign Application Priority Data

Feb. 9, 2002    (KR)    ............... 10-2002-0007788

(51) Int. Cl.
*H04L 12/28* (2006.01)
(52) U.S. Cl. .................... 370/395.6; 370/474
(58) Field of Classification Search ........... None
See application file for complete search history.

(56) References Cited

U.S. PATENT DOCUMENTS

| | | | | |
|---|---|---|---|---|
| 5,930,477 A * | 7/1999 | Uchida | ............... | 709/236 |
| 6,075,798 A * | 6/2000 | Lyons et al. | ............... | 370/474 |
| 6,229,822 B1 * | 5/2001 | Chow et al. | ............... | 370/474 |
| 6,490,286 B1 * | 12/2002 | Ono et al. | ............... | 370/395.31 |
| 6,594,267 B1 * | 7/2003 | Dempo | ............... | 370/395.64 |
| 6,597,696 B1 * | 7/2003 | Toyama et al. | ............... | 370/395.31 |
| 6,603,767 B1 * | 8/2003 | Murakami et al. | ............... | 370/395.64 |
| 6,621,821 B1 * | 9/2003 | Song | ............... | 370/395.6 |
| 6,747,974 B1 * | 6/2004 | Hayashi | ............... | 370/395.1 |
| 6,757,254 B2 * | 6/2004 | Ono et al. | ............... | 370/244 |
| 7,054,320 B1 * | 5/2006 | Lee et al. | ............... | 370/395.6 |
| 7,116,658 B1 * | 10/2006 | Almalki | ............... | 370/356 |
| 7,154,895 B1 * | 12/2006 | Bornemisza et al. | ............... | 370/395.1 |
| 2003/0026262 A1 * | 2/2003 | Jarl | ............... | 370/394 |
| 2007/0183437 A1 * | 8/2007 | DuRee et al. | ............... | 370/401 |

* cited by examiner

*Primary Examiner*—Huy D. Vu
*Assistant Examiner*—Phuongchau B Nguyen
(74) *Attorney, Agent, or Firm*—The Farrell Law Firm, PC

(57) ABSTRACT

Disclosed is an AAL2 (ATM (Asynchronous Transfer Mode) Adaptation Layer 2) switching apparatus. A cell deassembler for deassembling a payload of a received ATM cell into a CPS (Common Part Sublayer) packet, and generating a first VPC (Virtual Path Connection) by using the header of the ATM cell. A header converter for receiving the CPS packet from the cell deassembler and converting the first VPC into a second VPC by using a lookup table which have a number of VPCs and CIDs (Channel Identifiers) for changing the VPC. A cell assembler for receiving the CPS packet from the header converter, assembling an ATM cell which have the CPS packet and an ATM header generated from the second VPC.

8 Claims, 10 Drawing Sheets

| LOOK-UP TABLE ADDRESS | LOOK-UP TABLE DATA |
|---|---|
| 000000 | 000001 |
| 000001 | 102002 |
| 000002 | |
| .... | .... |
| 000100 | 000303 |
| .... | .... |

FIG.8C

AAL2 SWITCHING APPARATUS AND METHOD

PRIORITY

This application claims priority to an application entitled "AAL2 Switching Apparatus and Method" filed in the Korean Industrial Property Office on Feb. 9, 2002 and assigned Serial No. 2002-7788, the contents of which are incorporated by reference herein.

BACKGROUND OF THE INVENTION

1. Field of the Invention

The present invention relates generally to an AAL2 (ATM Adaptation Layer 2) switching apparatus and method, and in particular, to a switching apparatus and method using a memory mapping technique.

2. Description of the Related Art

In general, ATM (Asynchronous Transfer Mode) refers to an ATDM (Asynchronous Time Division Multiplexing) packet transmission technique. In the ATM, a basic information transmission unit becomes a "cell." In the ATM, every type of information is handled in an ATM cell with a fixed length of 53 bytes. Further, in the ATM, a protocol is simplified on the assumption that information is transmitted at high quality. Consequently, a switching process can be realized by hardware, and a switching delay can be reduced, thus achieving high-efficiency packet switching. Meanwhile, AAL serves to provide services having different communication characteristics in an ATM layer, such as voice, image and data services, to an upper application in a proper format. In particular, AAL2 is a protocol for providing a timing-dependent service such as voice and image services encoded at a variable rate in a transceiver.

of 53 bytes of the ATM cell, 5 bytes are used for a header and the remaining 48 bytes are used for an information field. The ATM cell, a data stream with a fixed length, becomes a unit of multiplexing and switching. The header includes VCI (Virtual Channel Identifier), VBI (Virtual Bus Identifier) and VPI (Virtual Path Identifier), for identifying a connection to which the cell belongs, and further includes CLP (Cell Loss Priority) for indicating whether to discard the cell during traffic congestion, PT (Payload Type) for distinguishing network control information, and HEC (Header Error Control) for detecting and controlling a header error.

However, since the ATM cell has a fixed of 53 bytes, a band (or byte) waste problem may occur when small-sized information such as voice information is transmitted. For example, since the 53-byte ATM cell is used even when transmitting 2 or 3-bytes of small information, 45 or 46 bytes of the 48-byte information field are wasted. To solve this problem, a CPS (Common Part Sublayer) packet has been proposed. The CPS corresponds to the AAL2, and the CPS packet has a variable length depending upon the size of information to be transmitted. During information transmission using the CPS packet, a plurality of CPS packets may be included in the information field of the ATM cell. In order to transmit information using the CPS packets, a new switching apparatus and method is required. Conventionally, a switching apparatus for switching packets in the AAL2 layer is realized by software. However, when the switching apparatus is realized by software, the capacity can hardly exceed 4K CIDs (Channel Identifiers) due to its performance limitations. However, when the AAL2 switching apparatus is realized by hardware, a large number of flip-flops (twice the number of connections supported) are required in order to convert a specific input CID into a specific output CID. Further, an FPGA (Field Programmable Gate Array) capacity for realizing the switching apparatus is increased.

SUMMARY OF THE INVENTION

It is, therefore, an object of the present invention to provide an AAL2 switching apparatus and method capable of reducing a switching delay time.

It is another object of the present invention to provide an AAL2 switching apparatus and method, which can be realized by hardware without increasing its complexity.

To achieve the above and other objects, the present invention provides an AAL2 switching apparatus in an ATM system. The apparatus comprises a cell deassembler for deassembling a payload of a received ATM cell into a CPS (Common Part Sublayer) packet, and converting a header of the CPS packet and a header of the ATM cell into a format for which a lookup table block can be consulted. A header converter receives the CPS packet from the cell deassembler and converts the header of the CPS packet by consulting the lookup table block so that the header of the CPS packet indicates a next path. A memory stores the lookup table block. A cell assembler receives the CPS packet from the header converter, converts the header of the CPS packet into a format needed in an ATM network, and generates an ATM cell by accumulating the CPS packets.

In addition, the present invention provides an AAL2 switching method in an ATM system including a lookup table block. The method comprises deassembling a received ATM cell into a CPS (Common Part Sublayer) packet; converting a header of the deassembled CPS packet and a header of the ATM cell into a format for which the lookup table block can be consulted; converting the header of the CPS packet by consulting the lookup table block so that the header of the CPS packet indicates a next path; and generating an ATM cell by assembling the CPS packet with the converted header.

BRIEF DESCRIPTION OF THE DRAWINGS

The above and other objects, features and advantages of the present invention will become more apparent from the following detailed description when taken in conjunction with the accompanying drawings in which:

FIG. 8C illustrates an example of a lookup table block stored in a memory according to an embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides an AAL2 switching apparatus and method using a memory mapping technique. By using the memory mapping technique, it is possible to realize the AAL2 switching apparatus by hardware.

Figure 1:
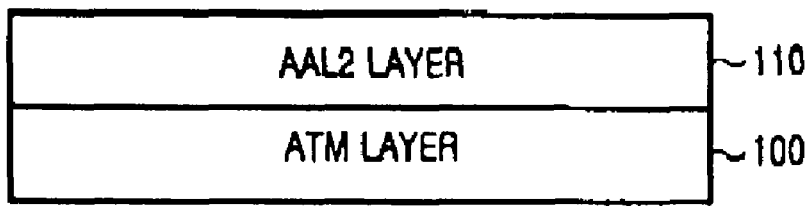
FIG. 1 illustrates an ATM layer and an AAL2 layer.

FIG. 1 illustrates an ATM layer and an AAL2 layer. Referring to FIG. 1, an ATM layer 100 and an AAL2 layer 110 use ATM cells and CPS packets, respectively. The CPS packets each are comprised of a header and a payload part, and a trailer part may be attached to the rear of the payload. An ATM cell of the ATM layer 100 can be converted into a CPS packet of the AAL2 layer 110. Conversion between the ATM cell and the CPS packet will be described later.

Figure 2:
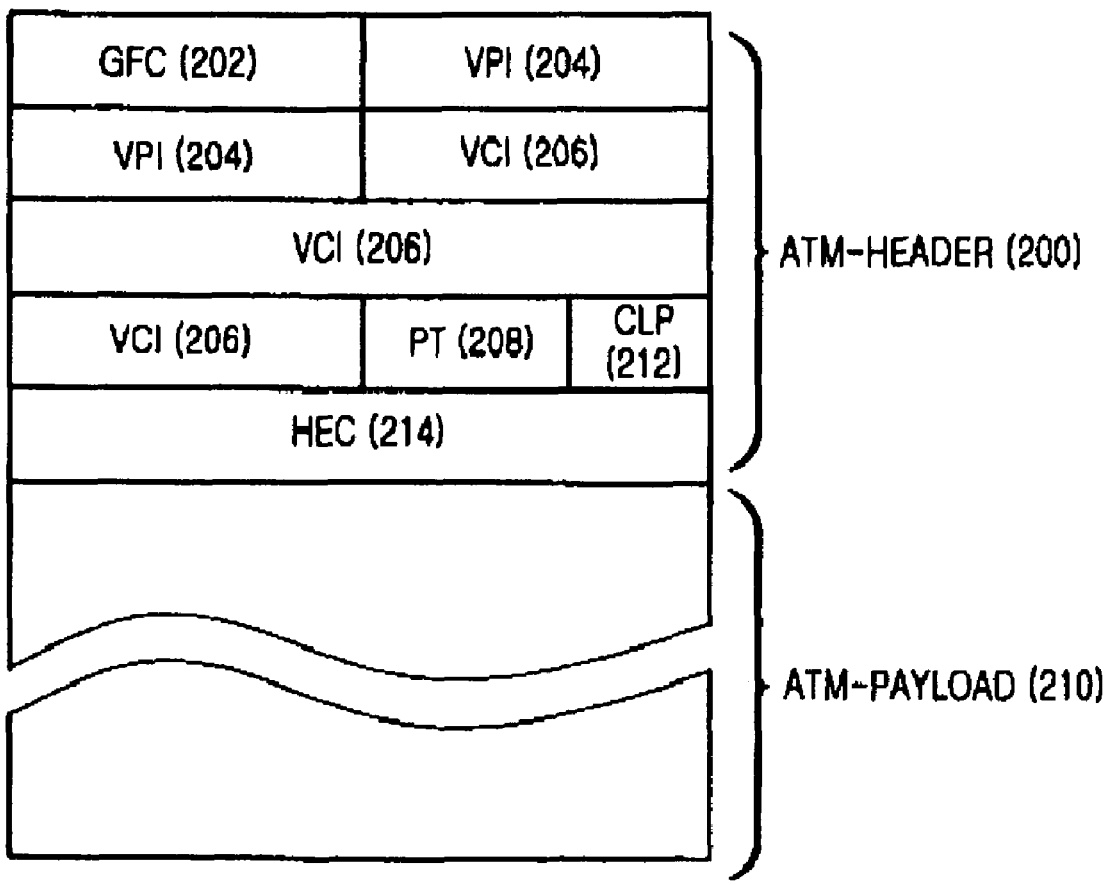
FIG. 2 illustrates a structure of an ATM header in an ATM cell.

FIG. 2 illustrates a structure of an ATM header in an ATM cell. Referring to FIG. 2, an ATM cell is comprised of a 5-byte ATM header 200 and a 48-byte payload 210. The ATM header 200 is comprised of 4-bit GFC (General Flow Control) 202, 8-bit VPI (Virtual Path Identifier) 204, 16-bit VCI (Virtual Channel Identifier) 206, 3-bit PT (Payload Type) 208, 1-bit CLP (Cell Loss Priority) 212, and 8-bit HEC (Header Error Control) 214. The GFC 202 is generally used by a user-network interface to perform contention control so that all terminals can fairly use transmission paths. In a network node interface (NNI) not using the GFC 202, the 4 bits of the GFC 202 are used for the VPI 204, so the VPI field 204 has 12 bits.

The VPI 204 and the VCI 206 are ATM routing fields for determining a communication path selected by an ATM cell. The VPI 204 is used to identify a virtual path used during transmission of an ATM cell, and the VCI 206 is used to identify a virtual channel in the virtual path, for data transmission. The PT 208 is used to distinguish network control information, and indicates whether an ATM cell is user information, an OAM (Operation, Administration and Maintenance) cell, or a resource management cell. The CLP 212 indicates whether to discard the cell during traffic congestion. The HEC 214 is used for error detection/correction codes of the header, and cell synchronization.

Meanwhile, when the AAL2, is used, the 48-byte ATM payload 210 may include one or several CPS packets.

Figure 3:
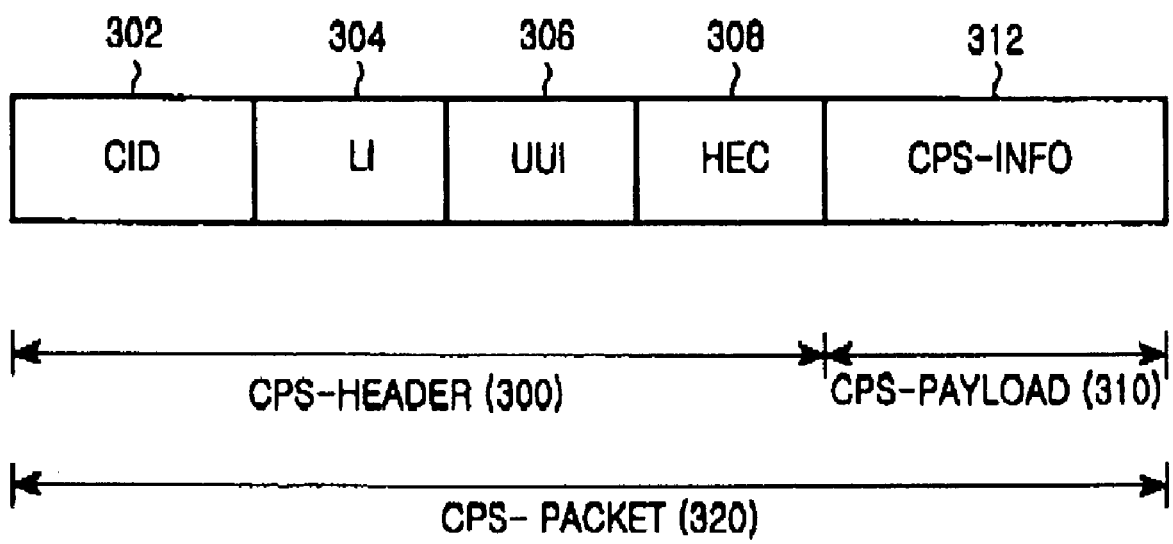
FIG. 3 illustrates a structure of a CPS packet.

FIG. 3 illustrates a structure of a CPS packet. As illustrated in FIG. 3, a CPS packet 320 is comprised of a CPS packet header 300 and a CPS packet payload 310. The CPS packet header 300 is comprised of 8-bit CID (Channel Identifier) 302, 6-bit LI (Length Indicator) 304, 5-bit UUI (User-to-User Indication) 306, and 5-bit HEC 308. The CPS packet payload 310 has a variable length of 1 octet (=8 bits or 1 byte) to 45 byte (or 64 byte). The CPS packet 320 comprised of the CPS header 300 and the CPS packet payload 310 is included in an information field, or the ATM payload 210 of the ATM cell, before being transmitted.

Figure 4A:
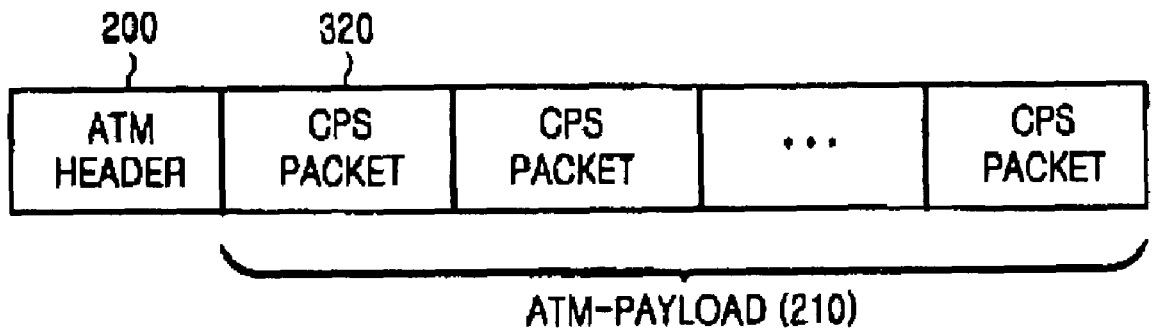
FIG. 4A illustrates an ATM cell with CPS packet.
Figure 4B:
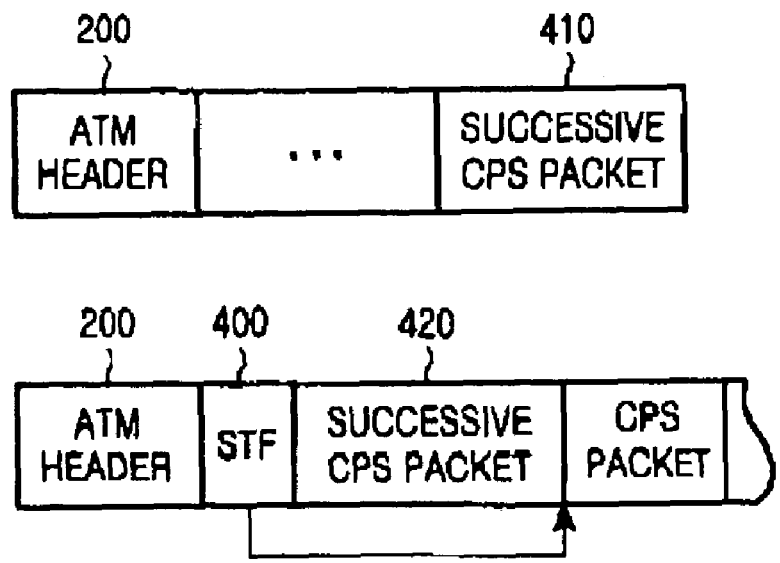
FIG. 4B illustrates a structure of a segmented CPS packet existing in an ATM cell.

FIG. 4A illustrates an ATM cell with CPS packets. As illustrated in FIG. 4A, each ATM cell includes a plurality of CPS packets 320 with the structure of FIG. 3, in the 48-byte ATM payload 210. Since the payload 310 of the CPS packet 320 has a size of a maximum of 45 bytes (or 64 bytes), there is a case where one CPS packet 320 cannot be fully included in one ATM payload 210. Meanwhile, the ATM payload 210 may include a plurality of CPS packets 320. In this case, even if a size of the CPS packet 32 is small, the CPS packet 320 is segmented and included in different ATM cells. When the CPS packet 320 is segmented and included in different ATM cells, a rear part of the segmented CPS packet 320 does not include the CPS header 300, so it is not possible to identify the segmented CPS packet 320. In this case, in order to identify the segmented CPS packet 320, a start field (STF) 400 of FIG. 4B is used. Generally, the STF 400 has a size of 1 byte.

FIG. 4B illustrates a structure of a segmented CPS packet existing in an ATM cell. As illustrated in FIG. 4B, the STF 400 is attached to the rear of the ATM header 200. When the STF 400 is detected from the ATM cell, a successive CPS packet 420 succeeding the STF 400 is connected to a successive CPS packet 410 included in the final portion of the payload of another ATM cell, thereby forming one CPS packet 320. The STF 400 indicates a end point of the successive CPS packet 420. That is, the STF 400 is set to indicate a start point of a next CPS packet 320 only when the successive CPS packet 420 is included in the ATM cell. Otherwise, the STF 400 is set to "0."

Figure 5:
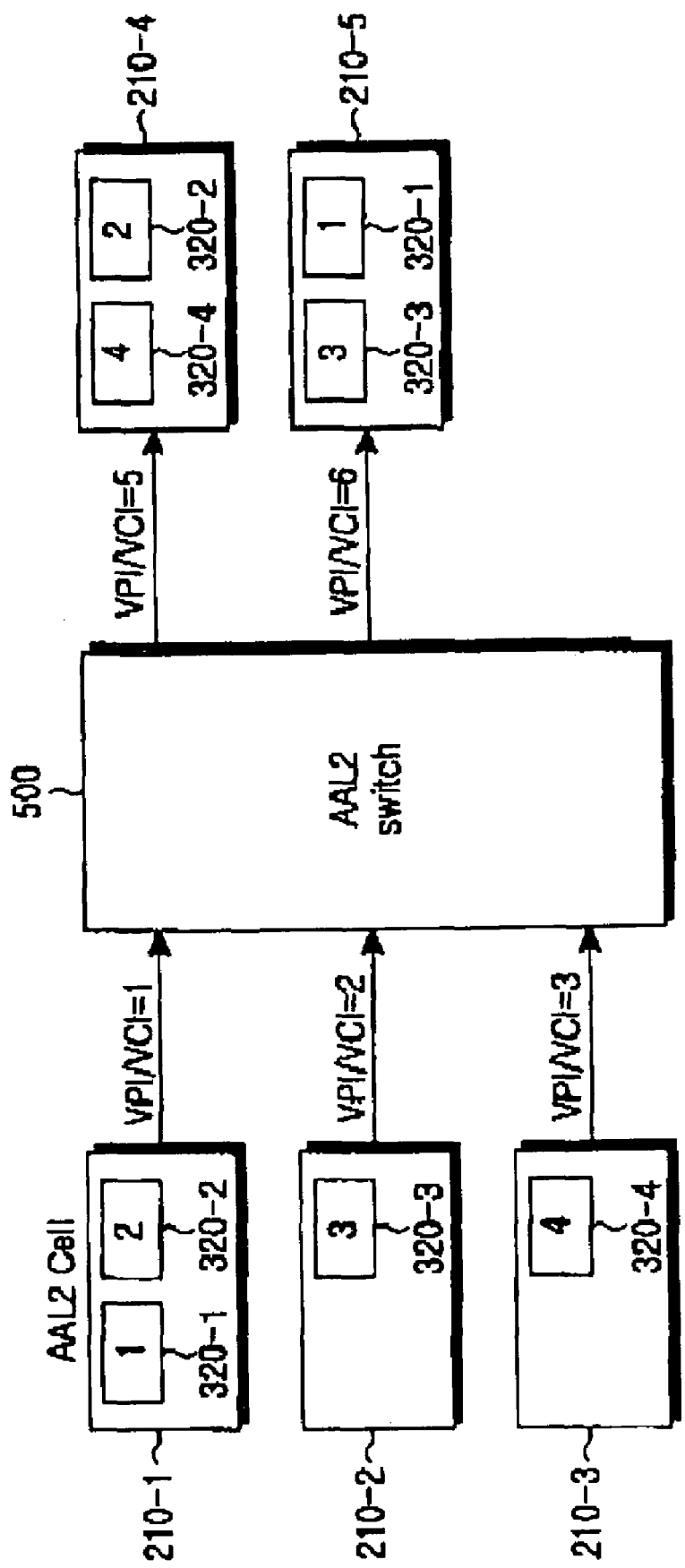
FIG. 5 illustrates an AAL2 switching concept.

FIG. 5 illustrates an AAL2 switching concept. The ATM cells 210-1 to 210-3 contain at least one of CPS packets 320-1 to 320-4. The ATM cells 210-1 to 210-3 are transmitted to an AAL2 switch 500 depending on information as to paths of the CPS packets 320-1 to 320-4, which is contained in an ATM header 200. A AAL2 switch 500 receives an ATM cell comprised of the CPS packets 320-1 to 320-4. The AAL2 switch 500 performs switching on the received CPS packets 320. "Switching on the CPS packet 320" refers to designating an output path using VPC/VCI contained in the ATM header 200 and the CID 302 of the CPS packets 320-1 to 320-4. That is, the AAL2 switch 500 reads destination information included in the headers of the received ATM cells 210-1 to 210-3 and the CPS packets 320-1 to 320-4, and switches the headers of the ATM cells 210-1 to 210-3 and the CPS packet 320-1 to 320-4 to indicate the next path of the cell based on the read information. In the course of the above switching, the CPS packets 320-1 to 320-4 are divided as per each destination and the ATM cells 210-4 to 210-5 constructed according to each destination is transmitted to a corresponding destination. In the present invention, switching on the CPS packet 320-1 to 320-4 is performed using a lookup table block, thus making it possible to enable efficient VPI/VCI/CID management through memory mapping.

Figure 6:
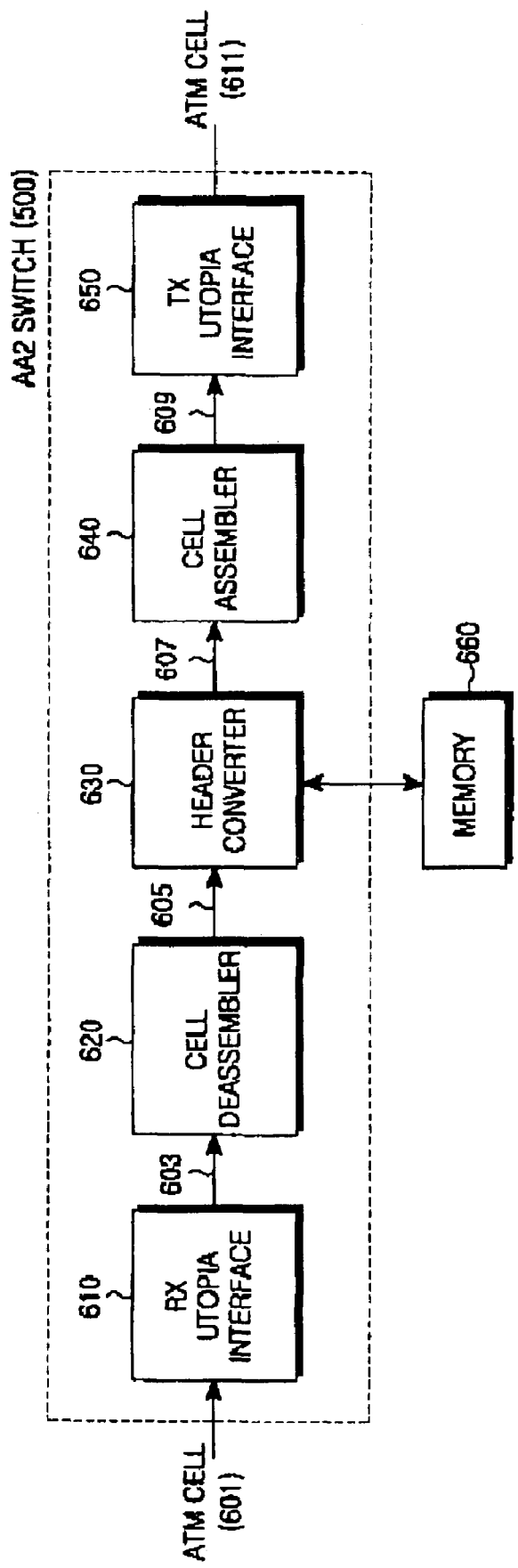
FIG. 6 illustrates an AAL2 switching apparatus according to an embodiment of the present invention.

FIG. 6 illustrates an AAL2 switching apparatus according to an embodiment of the present invention. Referring to FIG. 6, the AAL2 switch 500 receives an ATM cell 601 comprised of the CPS packets 320. A reception UTOPIA interface 610 receives the ATM cell 601 and provides the received ATM cell to a cell deassembler 620. The UTOPIA interface defines a format of control signals or data exchanged between a SAR (Segmentation and Reassembly) chip for ATM layer or AAL layer processing and a PHY (Physical Layer) chip for physical layer processing. The cell deassembler 620 reads a header 200 of the ATM cell provided from the reception UTOPIA interface 610, and generates VPC (Virtual Path Connection) based on VPI 204 and VCI 206 of the ATM header 200. Further, the cell deassembler 620 deassembles the CPS packets 320 included in the payload 210 of the received ATM cell. In addition, the cell deassembler 620 attaches the VPC generated based on the VPI 204 and the VCI 206 to the CPS packet 320 deassembled from the ATM payload 210, and provides the VPC-attached CPS packet to a header converter 630. The header converter 630 searches a look-up table using the VPC and CID of the received CPS packets and determines VPC and CID of the next path. And, the header of the CPS packets is changed into the above-determined VPC and CID. And then, the CPS packets are transmitted to a cell assembler 640. The cell assembler 640 strips the VPC from the CPS packets transmitted by the header converter 630 and the VPI and VCI is generated based on the VPC. And then, the generated one is recorded on the header of the ATM cell constructed according to each destination. Herein, it is noted that at least one-CPS packet having the same path may be included in the ATM cell. The cell assembler 640 transmits the ATM cell constructed according to the above path to a transmission UTOPIA interface 650. The transmission UTOPIA interface 650 transmits the received ATM cell through a corresponding path.

Signals illustrated in FIG. 6 will be described herein below. A signal 601 applied to the AAL2 switch 500 is an ATM cell comprised of ATM header 200 and ATM payload 210. A signal 603 provided from the reception UTOPIA interface 610 to the cell deassembler 620 is also an ATM cell. A signal 605 provided from the cell deassembler 620 to the header converter 630 is a VPC (702)-attached CPS packet 700 after being deassembled from the ATM cell 603. A signal 607 provided from the header converter 630 to a cell assembler 640 is the CPS packet 700, which includes generated VPC 702 and CID 302 in the header, so as to indicate the next path. A signal 609 provided from the cell assembler 640 to a transmission UTOPIA interface 650 is an ATM cell assembled from the CPS packet 700. An output signal 611 of the transmission UTOPIA interface 650 is an ATM cell comprised of ATM header 200 and ATM payload 210.

Figure 7:
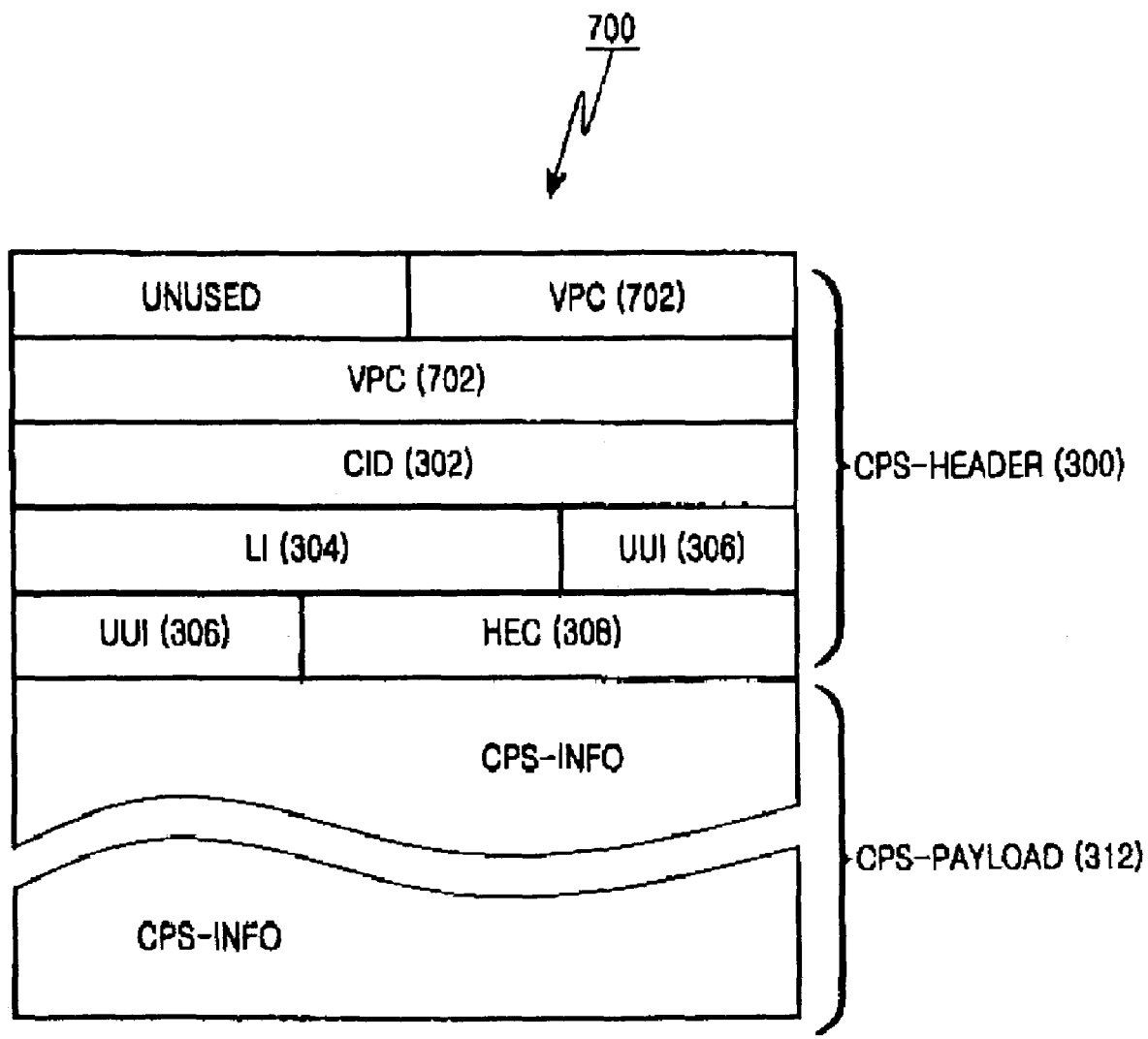
FIG. 7 illustrates a format of a CPS packet applied to a header converter in an AAL2 switching apparatus according to an embodiment of the present invention.

FIG. 7 illustrates a format of a CPS packet input to a header converter in an AAL2 switching apparatus according to an embodiment of the present invention. Referring to FIG. 7, the CPS packet 700 input to the header converter 630 in the AAL2 switch 500 is comprised of the CPS header 300 and the CPS payload 310, to which VPC 702 is attached. The VPC 702 and CID 302 of the CPS packet 700 represent path information of the CPS packet 700 (or 320). That is, the AAL2 switching is a function of reading the contents of the VPC 702 and the CID 302, and converting the VPC 702 and the CID 302 based on the read contents to indicate the next path.

The header converter 630 of FIG. 6 converts the VPC 702 and the CID 302 by consulting a lookup table block stored in a memory 660. The CPS packet 700 with the converted VPC 702 and CID 302 is provided to the cell assembler 640. The cell assembler 640 assembles an ATM cell again by receiving the CPS packets 700 and provides the assembled ATM cell to the transmission UTOPIA interface 650, and the transmission UTOPIA interface 650 transmits the ATM cell provided from the cell assembler 640 to a destination through an ATM network based on path information VPI and VCI included in the header.

Figure 8A:
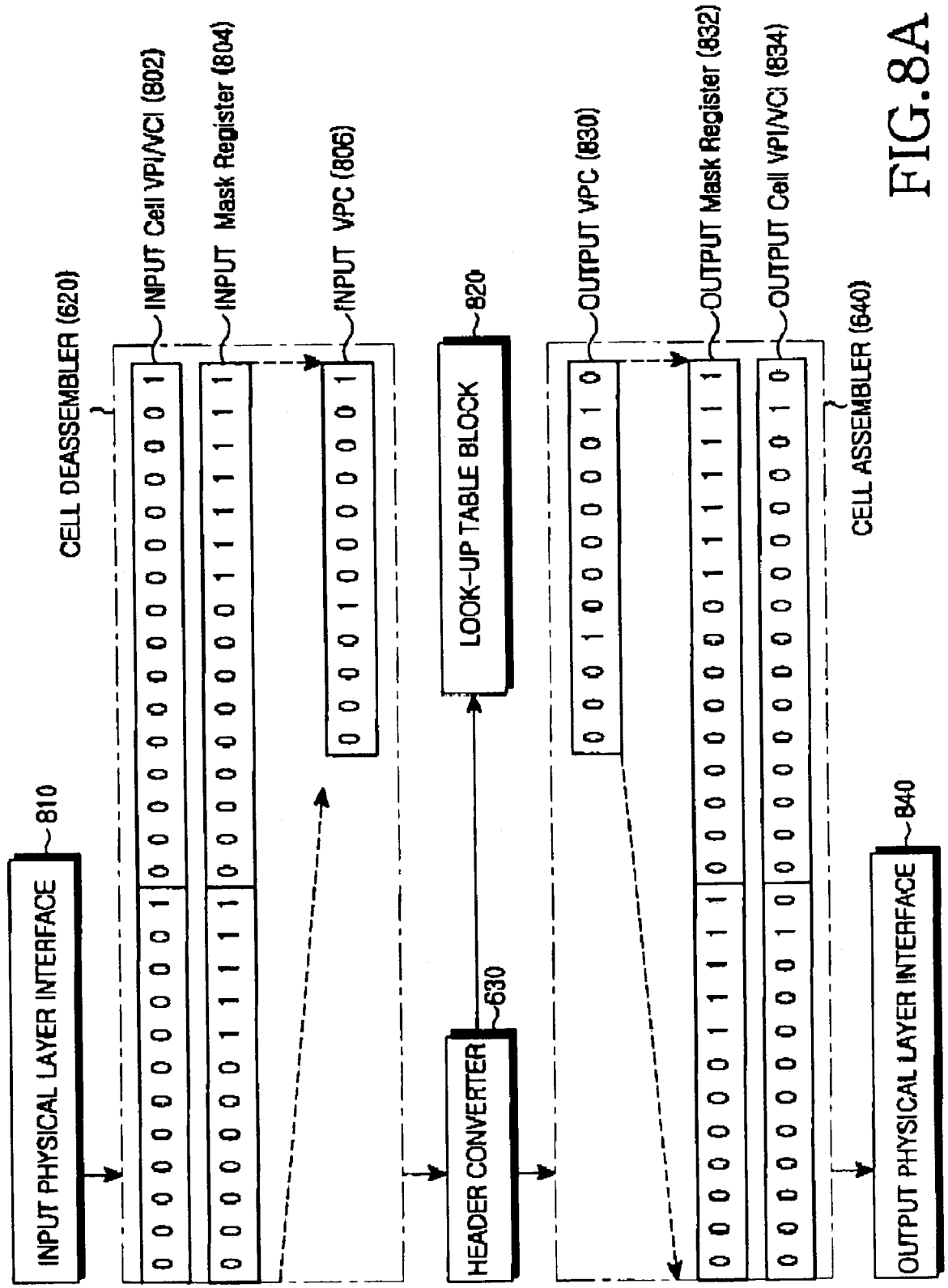
FIG. 8A illustrates an exemplary method of converting a CPS packet header in an AAL2 switching apparatus according to an embodiment of the present invention.

FIG. 8A illustrates an exemplary method of converting a CPS packet header in an AAL2 switching apparatus according to an embodiment of the present invention. Specifically, FIG. 8A illustrates a method of converting an input VPI/VCI/CID 1/1/1/ into an output VPI/VCI/CID 2/2/2, and masking 5 VPI bits and 7 VCI bits.

Referring to FIG. 8A, a physical layer interface 810 provides a received ATM cell to the cell deassembler 620 in the AAL2 switch 500. The cell deassembler 620 converts 28-bit input cell VPI/VCI 802 of the received ATM cell into 12-bit input VPC 806, and deassembles a payload 210 of the received ATM cell into CPS packet 320. When 12 bits to be used by an input mask register 804 are set to "1", as shown in FIG. 8A, the input VPC 806 is generated by selecting only the bits of INPUT CELL VPI/VCI (802) corresponding to those of the input mask register (804) set to "1." Generating 12 bits based on the 28 bits is to reduce an amount of information processed during AAL2 switching. However, the reduction in number of the bits causes a decrease in amount of switchable connection. Therefore, when it is necessary to switch massive information, it is possible to use 28 bits without a reduction in number of the bits.

The generated input VPC 806 is attached to the CPS packet 320, and the VPC (806)-attached CPS packet 700 is provided to the header converter 630. The header converter 630 latches the CPS packet 700 provided from the cell deassembler 620 to detect its header, and reads information stored in a lookup table block 820 thereby to perform header conversion on the CPS packet 700. The CPS packet 700 with the converted header is provided to the cell assembler 640. The lookup table block 820 is stored in the memory 660 of FIG. 6. The cell assembler 640 generates 28-bit output cell VPI/VCI 834 based on 12-bit output VPC 830, using information on the CPS packet 700 received from the header converter 630, stored in a spread register. The cell assembler 640 uses output mask register 832 during the header conversion. The bits of output VPC (830) are multiplied by those set to "1" in the output mask register (832) to arrive at the output cell VPI/VCI (834). If there is no reduction in number of bits during generation of the input VPC 806 based on the input cell VPI/VCI 802 by the cell deassembler 620, the process of converting the number of bits is excluded. In addition, the cell assembler 640 converts the received CPS packet 700 into a standard ATM cell. The ATM cell conversion is performed by accumulating received CPS packets 320 and forming ATM payload 210 using the accumulated CPS packets 320. The cell assembler 640 may output an ATM cell with an empty payload, if CPS packets 320 sufficient in number to assemble one ATM cell are not received until a predetermined time elapses based on a timer (not shown). Through this, it is also possible to reduce a delay time of the AAL2 switching apparatus. A physical layer interface 840 outputs the converted ATM cell.

Figure 8B:
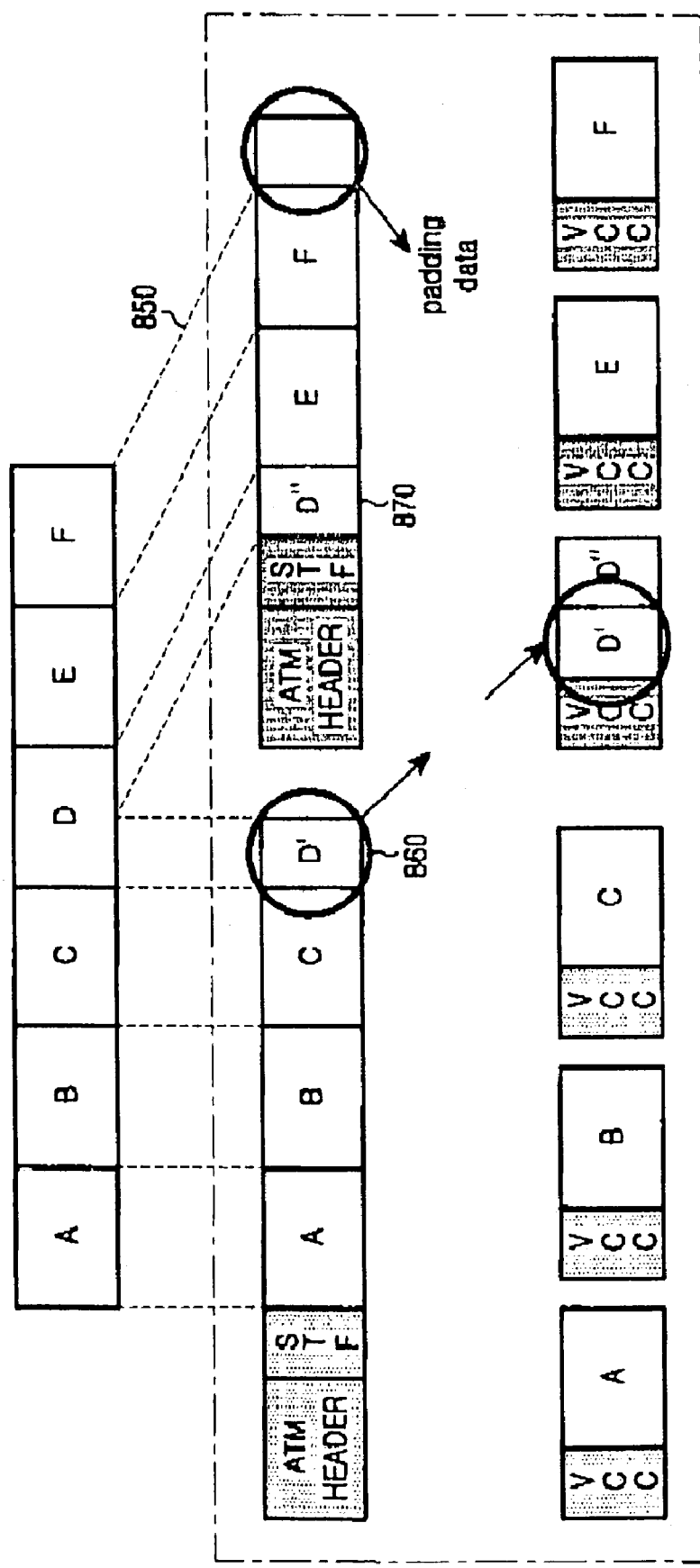
FIG. 8B illustrates an operation of a cell deassembler according to an embodiment of the present invention.

FIG. 8B illustrates an operation of a cell deassembler according to an embodiment of the present invention. Referring to FIG. 8B, the cell deassembler 620 deassembles payloads 210 of a received ATM cell into AAL2 packets with a specific header (VPC+CID) 300. That is, an operation, shown by a block represented by a dotted line, of deassembling the payloads 210 into CPS packets 320 with CPS header 300 is performed by the cell deassembler 620. The cell deassembler 620 converts incomplete packets D' 860 and D" 870 illustrated in FIG. 8B into complete packets, and provides the complete packets to the header converter 630. The CPS packet provided from the cell deassembler 620 to the header converter 630 after being converted has the format illustrated in FIG. 7. The packet having the 12-bit VPC and the 8-bit CID, masked as illustrated in FIG. 8A, is provided to the header converter 630. Therefore, the VPC 806 is filled with a value "000010000001" shifted by the input mask register 804, and the CID is filled with a value "00000001" for example. That is, when the input VPC 806 is combined with the CID, the combined value becomes "000010000001 00000001" in a binary number and "8101" in a hexadecimal number. If a binary number "0001000000100000010" or a hexadecimal number "10202" is written in an address 8101 of the lookup table block 820 in the header converter 630, a packet with VPC+CID="0001000000100000000" is output. As a result, an input VPI/VCI/CID 1/1/1 is converted into an output VPI/VCI/CID 2/2/2.

FIG. 8C illustrates an example of a lookup table block stored in a memory according to an embodiment of the present invention. Referring to FIG. 8C, the lookup table block 820 is comprised of a memory (e.g., SDRAM (Synchronous Dynamic Random Access Memory)), and stores input VPC/CID as an address and output VPC/CID as data.

Therefore, upon receiving a packet with VPC/CID of 0000/00, for example, the header converter 630 converts the header into data "000001" stored in a lookup table address "000000."

In the lookup table block 820, an address of the memory is expressed with a long word. Of course, the lookup table block 820 can be modified without departing from the spirit and scope of the invention. A controller (not shown) can be connected to the lookup table block 820, and connection registration is also performed by the controller. The controller stores the converted values of VPC 702 and CID 302 in the lookup table block 820 indexed (addressed) by the input values of the VPC 702 and CID 302.

That is, when an address having values of the VPC 702 and CID 302 before conversion is accessed from the lookup table block 820, the values stored at the address become values of the VPC 702 and CID 302 after conversion.

How to use the lookup table block 820 of FIG. 8C will be described in more detail. The numerical values stored in the lookup table block 820 are expressed with a hexadecimal number. Of the 6 digits, the first 4 digits represent VPC and the last two digits represent CID. How to use the lookup table block 820 of FIG. 8C will be described with reference to FIGS. 6 and 8A. The numerical values mentioned in the following description of the lookup table block 820 are hexadecimal numbers. It will be assumed herein that a CPS packet 700 with the VPC 702 of 0000 and the CID 302 of 00 is applied to the header converter 630 of the AAL2 switch 500 illustrated in FIGS. 6 and 8A. The header converter 630 detects a value of the VPC 702 and a value of the CID 302 from the lookup table block 820. The header converter 630 reads a value stored in the lookup table block 820 at the address given by the combination of VPC 702 and CID 302. Since the VPC 702 is 0000 and the CID 302 is 00, the header converter 630 reads a value stored in the position having an address 000000 from the lookup table block 820. The header converter 630 converts the values of the VPC 702 and the CID 302 into a value read from the lookup table block 820. Since 000001 is stored in the position with an address 000000 of the lookup table block 820, the values of the VPC 702 and the CID 302 for the CPS packet after conversion become 0000 and 01, respectively.

As another example, when CPS packet 700 with VPC 702 of 0000 and CID 302 of 01 is applied to the header converter 630, values of the VPC 702 and the CID 302 after conversion can be acquired from the lookup table block 820 in the above stated manner. That is, since a value stored in the address 000001 of the lookup table block 820 is 102002, if the CPS packet 700 has the VPC 702 of 0000 and the CID 302 of 01 before conversion, values of the VPC 702 and CID 302 of the CPS packet after conversion become 1020 and 02, respectively.

Figure 9:
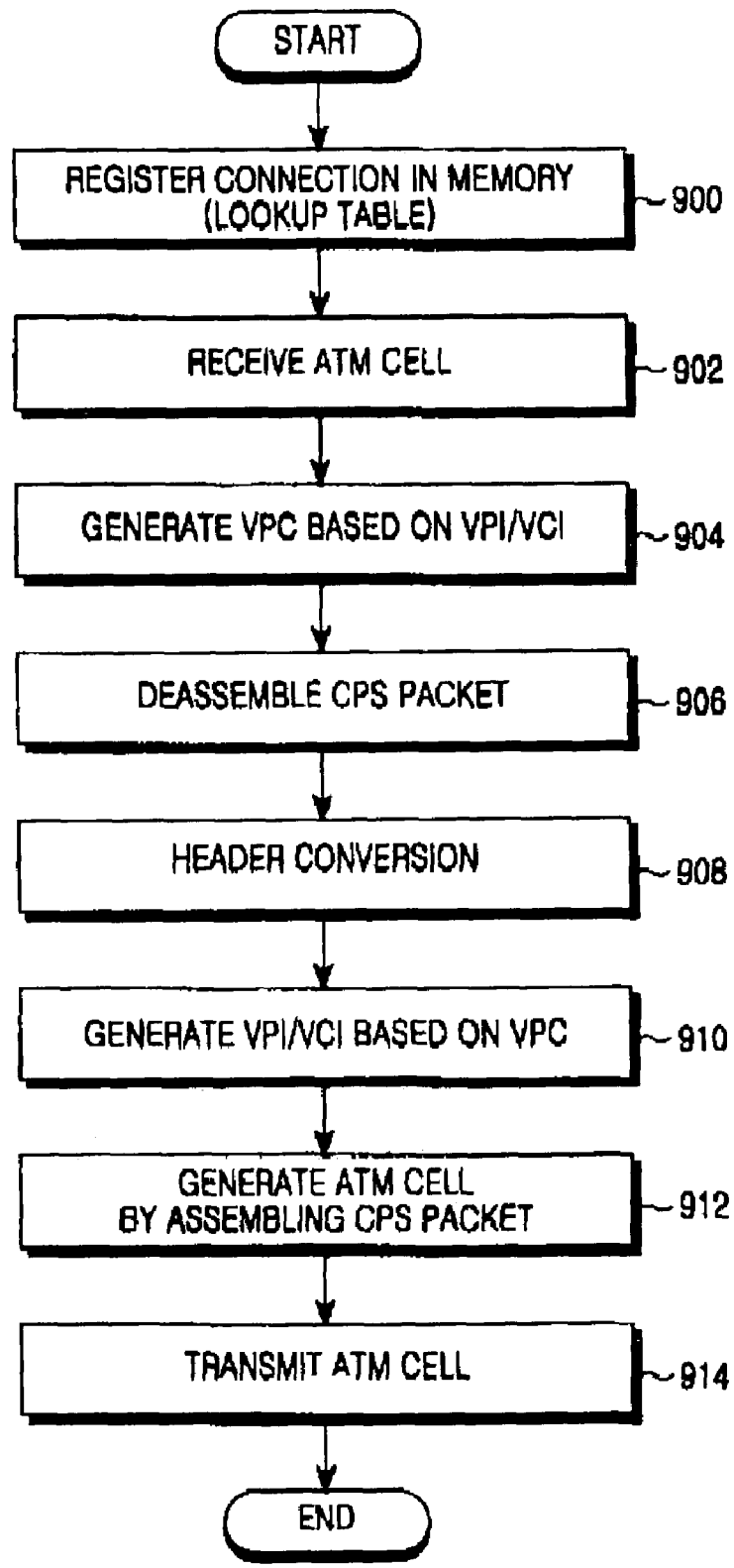
FIG. 9 is a flow chart illustrating an AAL2 switching method according to an embodiment of the present invention.

FIG. 9 is a flow chart illustrating an AAL2 switching method according to an embodiment of the present invention. Referring to FIG. 9, connection is registered in the memory 660 in step 900, and the reception UTOPIA interface 610 receives an ATM cell in step 902. In step 904, the cell deassembler 620 generates 12-bit VPC 702 based on VPI/VCI 204 and 206 in a header 200 of the received ATM cell provided from the reception UTOPIA interface 610. In step 906, the cell deassembler 620 deassembles the ATM cell into CPS packet 320, attaches the 12-bit VPC 702 to the CPS packet 320 deassembled from the ATM cell, and provides the VPC-attached CPS packet 320 to the header converter 630. In step 908, the header converter 630 detects values of the VPC 702 and the CID 302 included in the header of the CPS packet 700, and converts the detected values into new values of the VPC 702 and the CID 302 by consulting the lookup table block 820. The CPS packet 700 with the converted VPC 702 and CID 302, i.e., with the converted header, is provided to the cell assembler 640. In step 910, the cell assembler 640 generates again the VPI/VCI 204 and 206 based on the VPC 702 included in the CPS packet 700. In step 912, the cell assembler 640 converts again the CPS packet 700 with the converted header, received from the header converter 630, into a CPS packet 320 with a header format used in the network, accumulates the CPS packets 320, and assembles the accumulated CPS packets 320 into an ATM cell. There are two methods of generating the ATM cell. A first method is to wait until the CPS packets 320 sufficient in amount to assemble one ATM cell are received, and generate an ATM cell with no empty payload 210. A second method is to assemble an ATM cell with the CPS packets 320 received for a predetermined time period. When the CPS packets 320 not sufficient in amount to assemble one ATM cell are received, the second method generates the ATM cell with an at least partially empty payload 210. The first method can be used to increase transmission efficiency, and the second method can be used to reduce the delay time. The ATM cell assembled in step 912 is provided to the transmission UTOPIA interface 650. In step 914, the transmission UTOPIA interface transmits the ATM cell provided from the cell assembler 640.

The reason for compressing the 12-bit VPI 204 and the 16-bit VCI 206 of the ATM header 200, i.e., a total of 28 bits, into 12-bit VPC 702 is because a hardware capacity must be increased in order to look up all the 28 bits. Of course, this can be applied because the current AAL2 switch 500 does not require such massive connection. In the future, if the connection required by the AAL2 is increased, a service may be provided using all the 28 bits. Therefore, the number of bits is not limited to 12. In addition, since one VPC 702 may be combined with 256 CIDs 302 (1 byte=8 bits, $2^8$=256), there are $2^{12} \times 2^8 = 2^{20} \approx 1M$ switchings available for the 12-bit VPC 702, and there are $2^{30}$ switchings available for the 28-bit VPC 702.

In this manner, the switching capacity is increased. In addition, since it is possible to perform switching by hardware, a time required for the switching is decreased.

As described above, the present invention provides an AAL2 switching apparatus capable of efficient connection management. The AAL2 switching apparatus can be used for an ATM core switch, thereby to increase the CPS packet switching capacity and the switching speed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An AAL2 (ATM (Asynchronous Transfer Mode) Adaptation Layer 2) switching apparatus in an ATM system, comprising:

a cell deassembler for deassembling a payload of a received ATM cell into a CPS (Common Part Sublayer) packet, and compressing a Virtual Path Identifier (VPI) and a Virtual Channel Identifier (VCI) of the ATM header into a first Virtual Path Connection (VPC) wherein the cell deassembler reduces a number of bits in use by performing bit compression on a header of the CPS packet, and a cell assembler restores the number of bits reduced by the cell deassembler;

the header converter for receiving the CPS packet from the cell deassembler and converting the first VPC into a second VPC by using a lookup table which have a number of VPCs and CIDs (Channel Identifiers) for changing the VPC; and a cell assembler for receiving the CPS packet from the header converter, assembling an ATM cell which have the CPS packet and an ATM header generated from the second VPC.

2. The AAL2 switching apparatus of claim 1, wherein the cell deassembler generating VPC by using VPI (Virtual Path Identifier) and VCI (Virtual Channel Identifier) of the ATM header, and attaches the VPC to the header of the CPS packet.

3. The AAL2 switching apparatus of claim 1, wherein the lookup table block stores VPC and VCI values to be generated, in a position having the VPC and VCI values of the received CPS header as an address.

4. The AAL2 switching apparatus of claim 1, wherein the header converter detects a VPC value of the CPS packet received from the cell deassembler, reads a value having the VPC value as an address from the lookup table block, and defines the read value as a next path of the CPS packet.

5. The AAL2 switching apparatus of claim 1, wherein connections stored in the lookup table block are registered by a controller.

6. The AAL2 switching apparatus of claim 1, wherein the cell assembler includes a timer for counting a time required in generating an ATM cell, and the cell assembler generates an ATM cell with an at least partially empty payload after a lapse of a predetermined time.

7. An AAL2 (ATM (Asynchronous Transfer Mode) Adaptation Layer 2) switching method in an ATM system including a lookup table block for storing a second VPC (Virtual Path Connection) corresponding to a first VPC before the generation, comprising the steps of:
(a) reducing a number of bits in use by performing bit compression on a header of the ATM cell;
(b) deassembling a received ATM cell into a CPS (Common Part Sublayer) packet;
(c) compressing a Virtual Path Identifier (VPI) and a Virtual Channel Identifier (VCI) of the ATM header into a first Virtual Path Connection (VPC);
(d) converting the first VPC into a second VPC by using the lookup table block; and
(e) assembling an ATM cell which have the CPS packet and generating an ATM header from the second VPC wherein the number of bits in use by performing bit shifting on the ATM cell generated are restored.

8. The AAL2 switching method of claim 7, further comprising assembling an ATM cell with an empty payload, if no ATM cell is assembled within a predetermined time in the step (e).

* * * * *